UNITED STATES PATENT OFFICE.

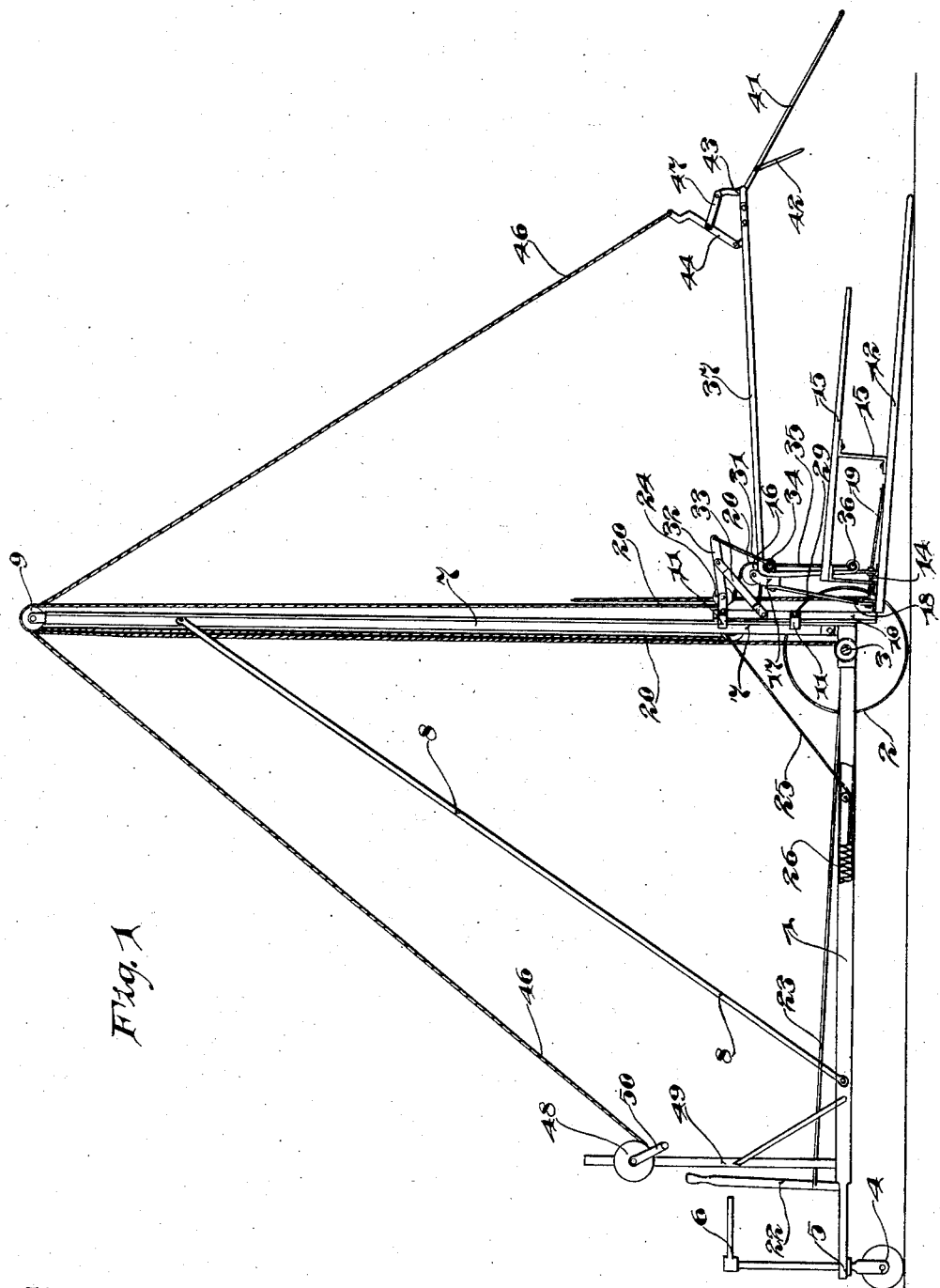

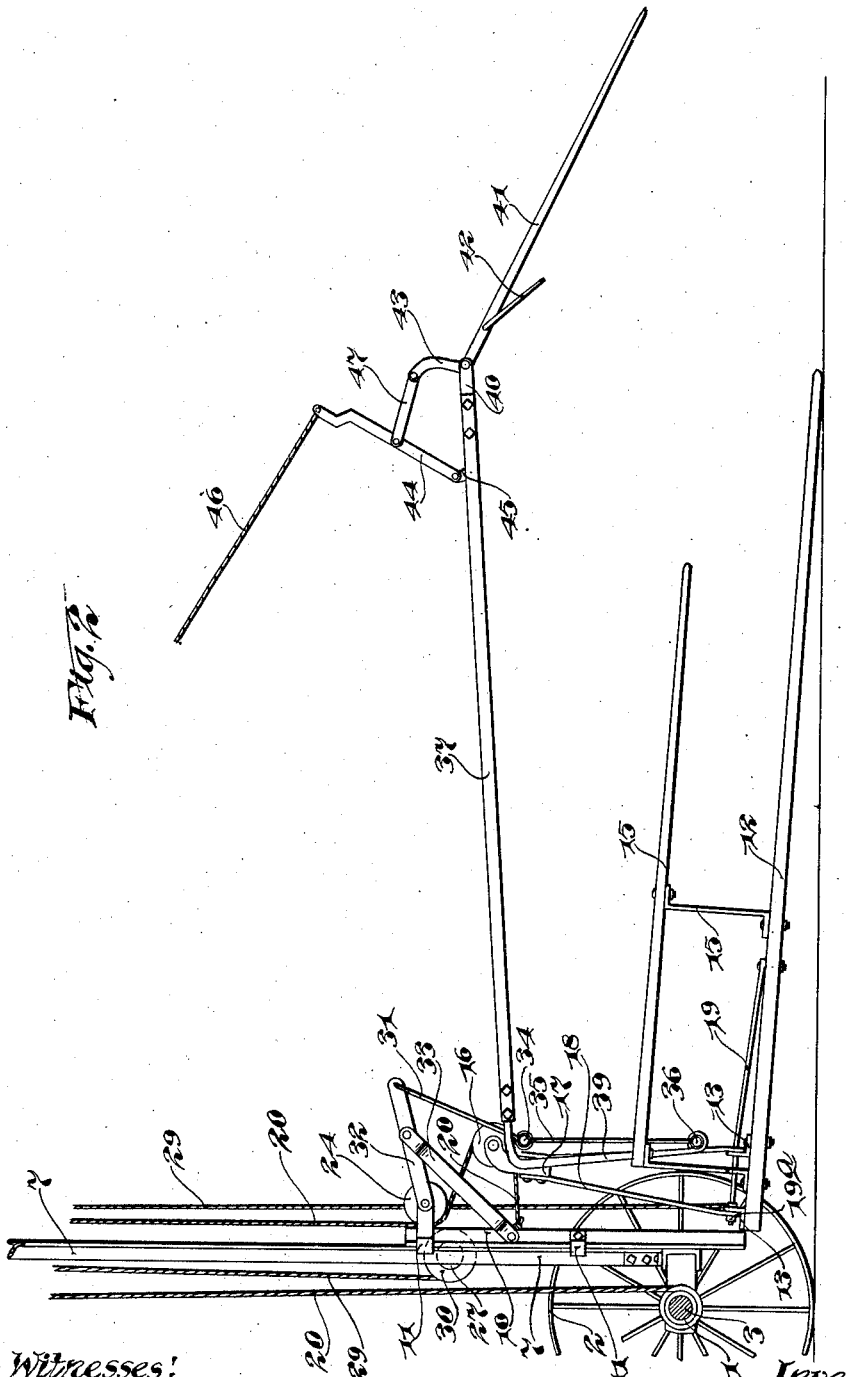

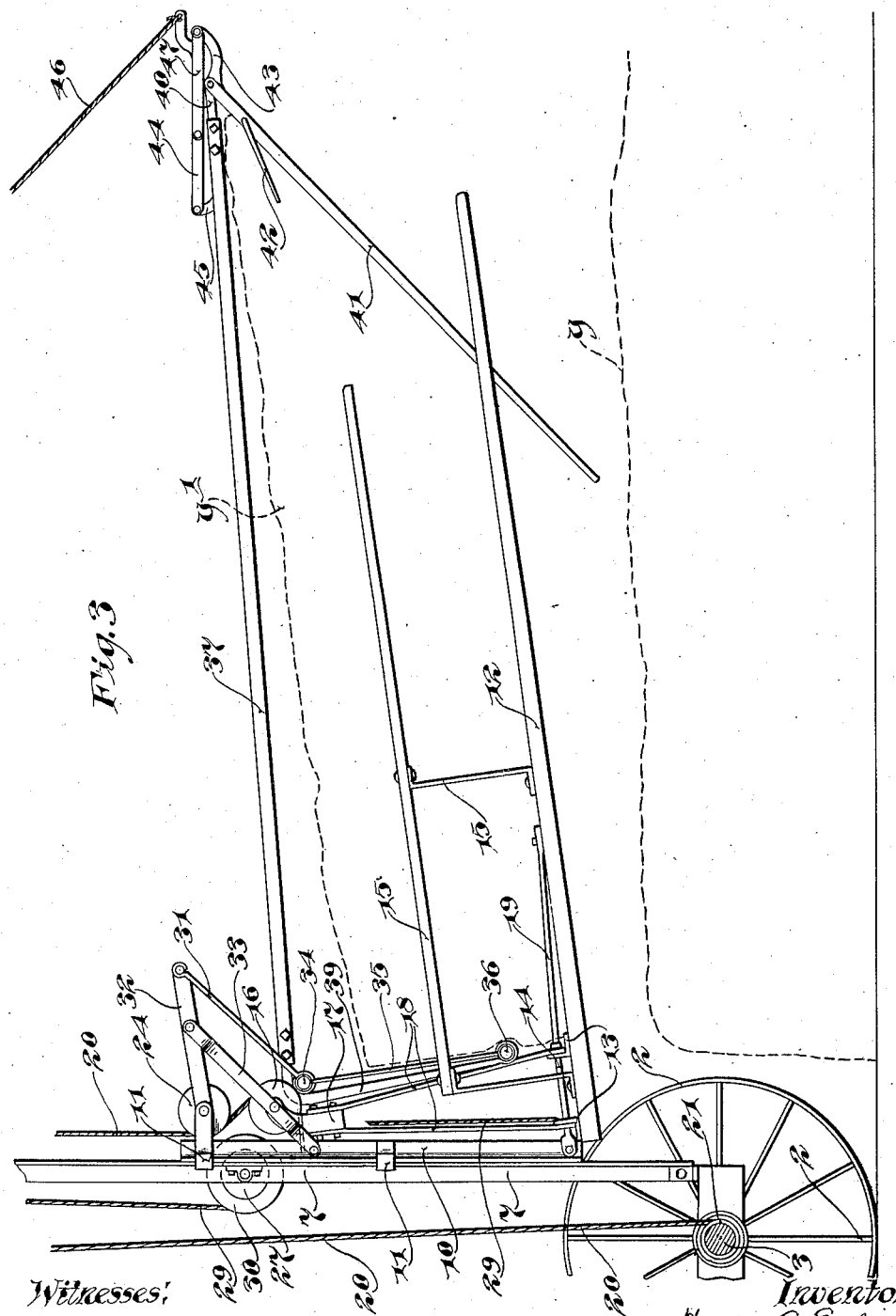

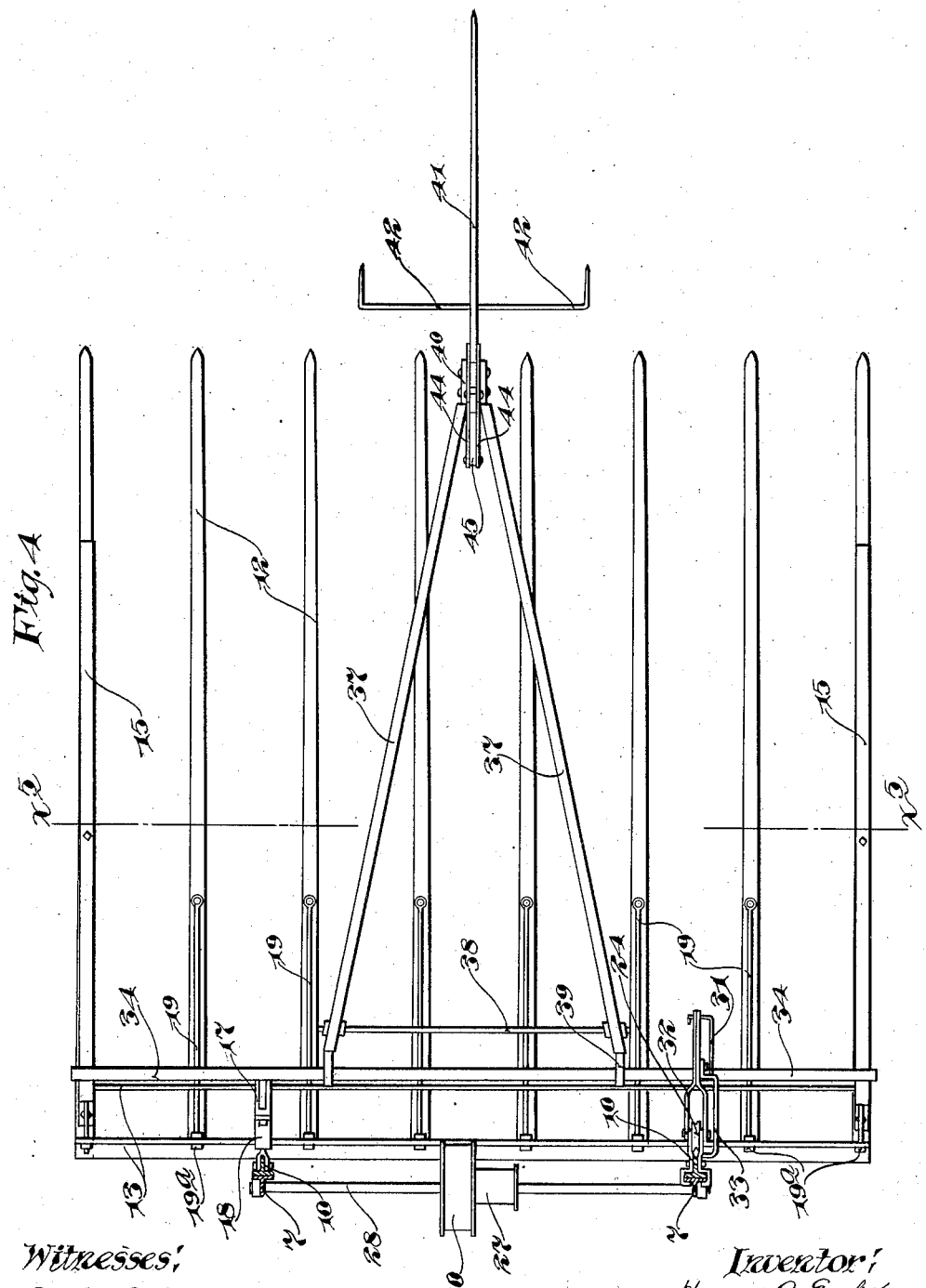

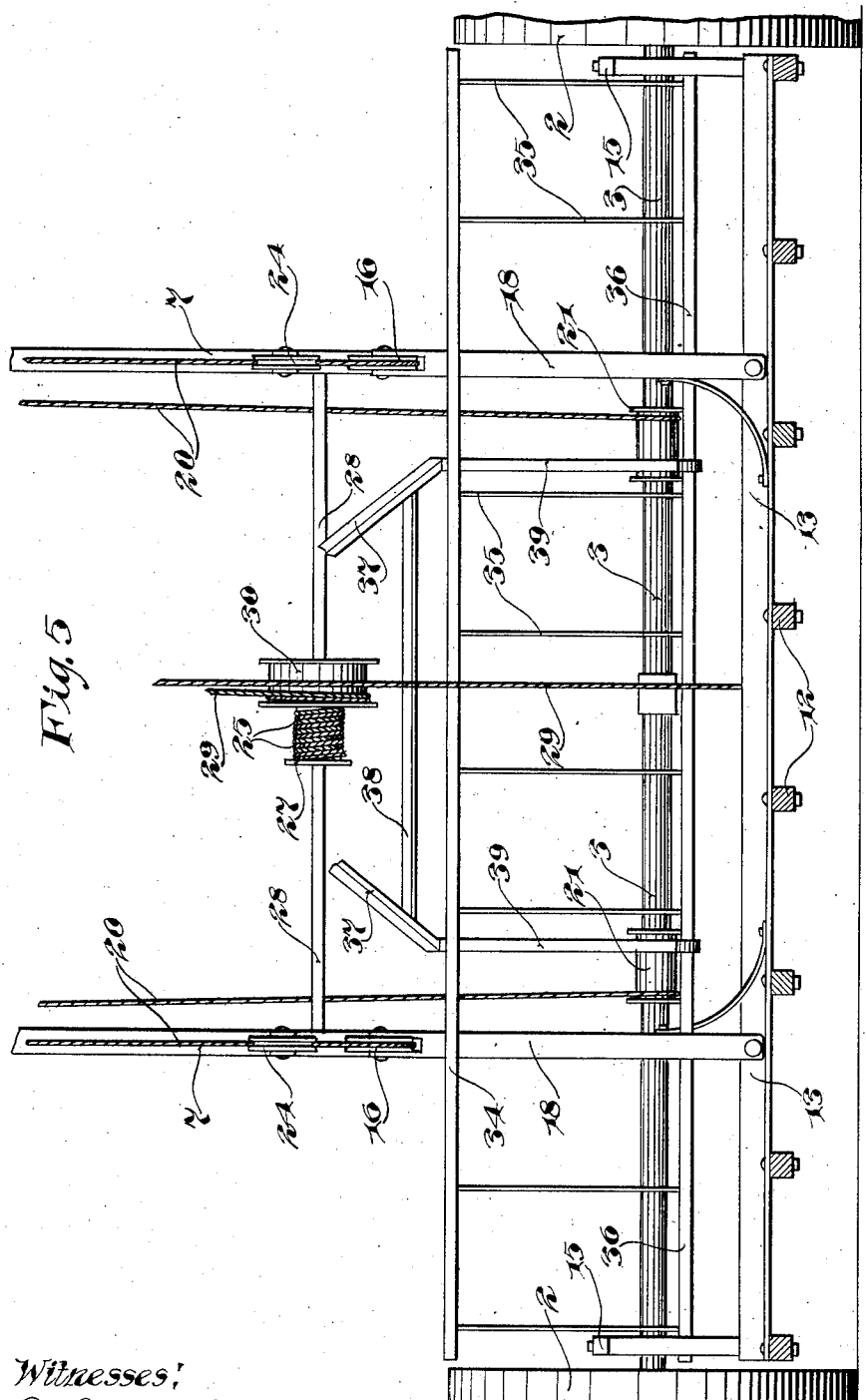

HENRY C. ERBE, OF JAVA, SOUTH DAKOTA.

GRAIN OR HAY DELIVERER.

1,025,794.     Specification of Letters Patent.     Patented May 7, 1912.

Application filed November 11, 1910. Serial No. 591,777.

*To all whom it may concern:*

Be it known that I, HENRY C. ERBE, a citizen of the United States, residing at Java, in the county of Walworth and State of South Dakota, have invented certain new and useful Improvements in Grain or Hay Deliverers; and I do hereby declare the following to be a full, clear, and exact description of the invention, such as will enable others skilled in the art to which it appertains to make and use the same.

My invention relates to that class of agricultural implements adapted for use in gathering and carrying either loose or bound grain or hay and in carrying and depositing the same either in a stack or on a wagon rack.

The invention is especially designed as an improvement on the so-called hay or grain deliverer disclosed and claimed in my prior Patent 708,804, of date September 9, 1902, and is particularly directed to the provision of an improved so-called packing device for packing the grain or hay on the carrying fork and for holding the same securely on the fork while being conveyed from the field to the stack or other place of deposit.

Generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a view in side elevation, with some parts broken away and some parts removed, showing the improved machine; Figs. 2 and 3 are views in side elevation, with parts broken away, showing the front portion of the machine but illustrating different positions of the parts; Fig. 4 is a plan view of the parts shown in Fig. 2; and Fig. 5 is a transverse vertical section taken on the line $x^5$ $x^5$ of Fig. 4, some parts being broken away.

The main frame 1 is supported at its front end portions by traction wheels 2, which drive a long axle 3 journaled in suitable bearings on the front portion of said frame. The rear of the said frame 1 is supported by a steering wheel 4 mounted in the forked lower end of a steering post 5 provided at its upper end with a hand lever 6. Long upright columns 7 are pivotally connected, at their lower ends, to the front end portion of the frame 1 and are supported either in true vertical positions or in forwardly inclined or rearwardly inclined positions, by means of brace bars 8, the lower ends of which are adjustably connected to the frame 1 in a manner fully disclosed in my said prior patent and not necessary for the purposes of this case to consider. The upper ends of the columns 7 are preferably tied together substantially in the manner disclosed in my said prior patent, and they carry several guide sheaves, only one of which, to-wit, the guide sheave 9, requires particular notice for the purposes of this application.

Upright fork carriers 10 are mounted to slide vertically on the columns 7 and, as shown, are provided with keeper brackets 11 that engage the flanges of the said columns. The tines or bars 12 of the gathering fork, at their rear ends, are shown as rigidly connected to a pair of cross tie bars 13, through which coupling bolts 14 are passed, the rear ends of said bolts being pivotally attached to the lower ends of the fork carriers 10, to thereby pivotally connect the fork to the said carriers. Retaining guards 15 are shown as secured on top of the outside tines or fork bars 12, to assist in holding the load on the fork. Cable guiding sheaves 16 are journaled to the upwardly projecting portions of the brackets 17 rigidly secured to the upper ends of metal straps 18, the lower ends of which are attached to the front and rear portions of the respective coupling bolts 14. These metal straps 18 and the connected brackets 17 afford trussed fork actuating levers operating as hereinafter more fully explained.

Truss rods 19 are attached to the intermediate portions of the fork tines 12 and are passed through the upwardly extended flanges of the tie bars 13 and are provided at their rear ends with nuts 19ª (see Figs. 2 and 4), by adjustments of which the free ends of the tines may be permanently set in true horizontal transverse alinement.

For raising and lowering the fork on the columns and for imparting an initial upward tilting movement thereto when raised, I preferably employ substantially the same mechanism illustrated for the same purpose in my said prior patent. This mechanism, briefly described, includes a pair of lifting cables 20 passed over suitable guides such as guide sheaves on the upper portions of the columns 7 and, at their front lower ends, attached to the fork carrier bars 10, as best shown in Fig. 2, and at their rear lower ends, attached to and adapted to be wound upon windlass drums 21 that are loose on the driving axle 3 but are adapted to be connected to said axle at will by suitable clutch devices, not shown, but controlled by a lever 22 and rod 23, all as fully disclosed in my said prior patent. The front portions of the cables 20 run over the respective guide sheaves 16 on the upper portions of the fork actuating levers 17—18 and also over guide sheaves 24 journaled to projections of the upper keepers 11 of the fork carrier.

Preferably, the gathering fork and its carrier are counterbalanced in part by the mechanism for that purpose disclosed in my said prior patent. This counterbalancing mechanism, however, forms no part of the present invention and, hence, the parts thereof shown in the present drawings may be briefly enumerated as follows: The numeral 25 indicates the cable which is drawn rearwardly by a spring 26 attached to the truck frame 1 and the other end of which is attached to a sheave 27 mounted on a transverse rod 28 secured to the columns 7. The numeral 29 indicates another cable which, at one end, is attached to the rear transverse bar 13 of the gathering fork, is passed upward over a suitable guide, such as a sheave not shown, on the upper column structure 7 and from thence is brought downward and attached to a drum 30 secured to the said drum 27.

In Fig. 3, a grain or hay stack is indicated in dotted lines by the character $y$, and a load of hay or grain on the raised gathering fork is indicated by dotted lines marked $y^1$.

We now consider the mechanism which constitutes the salient feature of the present invention and which is in the nature of a device by the use of which the load of hay or grain may be more certainly delivered on to the gathering fork, more tightly packed thereon, and securely held on the fork while the load is being transported from one place to another. This improved device is herein designated broadly as a packer and, as preferably constructed, it comprises a packer frame which is adapted to overlie the load on the fork, which is provided at its front end with a pivoted ground engaging packer arm or fork and with a lock device for automatically securing the said packer arm or fork in its extreme back-turned position. Lock actuating connections are also provided whereby the packer arm may be released at will and given an upward and forward movement and thereby reëngaged with the ground, when desired, at a point ahead of the fork. Also, connections are provided for supporting the entire packer, so that when the load has been deposited on the stack and the machine backed up, the said packer will remain stationary in respect to the stack while the load is being given its initial movement off from the receding or outwardly drawn fork.

The improved packer and its coöperating connections just described in a general way are in the drawings illustrated as of a form put into actual use and which described in detail are as follows: A pair of laterally spaced links or hangers 31 are pivoted, at their upper ends, to brackets shown as made up of connected metal straps 32 and 33, the former of which is shown as attached to the upper guide keepers 11 and the latter of which is shown as attached to the fork carriers 10. A transverse rod, shown as in the form of a metal pipe 34, is secured to the lower ends of the links 31, and a multiplicity of bars 35 are pivoted, at their upper ends, on the said pipe 34 and, at their lower ends, are secured to another transverse pipe 36. The bars 35 and the lower rod or pipe 36 make up a skeleton rack which is limited in its rearward movement by the front lever straps 18 and which serves as a back stop against which the load $y^1$ will be accumulated. As is evident, the accumulation of the load will force the said back stop or rack to its extreme rearmost position just stated and shown both in Figs. 2 and 3.

The frame of the packer is shown as made up of forwardly converging bars 37, connected at their rear ends by a rod 38 and provided with down-turned extensions or arms 39 that are pivoted on the lower pipe or rod 36. The upper portions of the extensions 39 engage the upper pipe or rod 34 and thus limit the downward movement of the front end of the said packer frame. At their front ends, the bars 37 are rigidly secured to a metallic extension 40, to which a long depending packer arm or fork 41 is pivoted at its upper end. This packer arm or fork 41 is shown as provided with short laterally projecting prongs 42 located near its upper portion and for action on the upper front portion of the load (see particularly Figs. 3 and 4). At its pivoted upper end, the said packer arm 41 is provided with a short forwardly and upwardly projecting portion 43. An arm actuating lever 44 is pivoted to a lug 45 on the front portion of the packer frame 37 and is extended forwardly and its free end is attached to an operating cable 46. A link 47 connects the packer arm extension 43 to the intermediate portion of the actuating lever 44. The said link 47 and the rear portion of the lever 44 make up a toggle, which, when forced downward, as shown in Fig. 3, is slightly below a dead center, so that it constitutes a self-acting or automatic lock which will lock the packer arm 41 in its back-turned position shown in said Fig. 3.

When the cable 46 is drawn so as to raise the free front end of the lever 44, the said toggle will be buckled and the said packer arm 41 will be forced forward into a position shown in Fig. 2. By further rearward movement or drawing action on the cable 46, the packer frame 37 may be raised in respect to the fork, so that the free end of the packer arm 41 will clear the ground in its forward swinging movement. When the parts are in the position shown in Fig. 2, the point of the packer arm 41 may be engaged with the ground by giving sufficient slack to the operating cable 46. Hence, the packer arm may be used over and over again as many times as desired during the accumulation of a single load. When the packer arm is dropped into engagement with the ground, it will pass through the windrow or loose grain or hay, and when the packer arm is then held in engagement with the ground at its lower end while the fork is moved forward, the said packer arm will positively force the grain or hay onto the fork and will pack the same upon the fork, so that the fork may be well loaded. It is already indicated, after the proper load has been accumulated on the fork, the load may be locked on the fork simply by leaving the packer arm in its back-turned position shown in Fig. 3, in which position it will be automatically locked by the toggle 44—47.

When the loaded fork has been properly raised from the ground, it may be driven to the stack and the fork positioned over the top of the stack, as shown in Fig. 3. Then, when the fork is lowered onto the top of the stack, the packer arm 41 will be engaged with the stack so that when the machine is backed up or moved away from the stack, the entire packer and the back stop 35 will be anchored to the stack, thereby holding the load in proper position while the fork is being given its initial drawing movement outward from under the load. After the fork has been partly withdrawn, and before the links 31 commence to draw the packer and back stop outward with the machine, the toggle 44—47 should be tripped so as to permit the packer arm 41 to swing forward and release itself from the stack.

Various connections may be provided for manipulating the operating cable 46, but, as shown, this cable is passed over the guide sheave 9 on the top of the column structure, and is secured to a windlass drum 48 mounted on a pedestal 49 secured to the rear portion of the truck frame 1. The said windlass drum 48 is shown as provided with an operating crank 50.

It will, of course, be understood that this machine, like that of my prior patent, is adapted to be driven forward by horses located at the rear of the gathering fork and connected to draft devices applied to the rear portion of the truck frame.

What I claim is:

1. In a machine of the kind described, the combination with a gathering fork, of a packer having a dependent packing arm pivoted at its upper end and movable in front of the said fork, the lower end of said packing arm being arranged for engagement with the ground, to force said arm rearward under the advance movement of the machine, means for moving said arm into and out of engagement with the ground, and a lock for securing said packing arm rearward in position to hold the load on said fork.

2. In a machine of the kind described, the combination with a gathering fork, of a packer having a dependent packing arm pivoted at its upper end and movable in front of the said fork, the lower end of said packing arm being arranged for engagement with the ground, to force said arm rearward under the advance movement of the machine, means for moving said arm into and out of engagement with the ground, an automatic lock for securing said packing arm rearward in position to hold the load on said fork, and means for tripping the said load from a distant point.

3. In a machine of the kind described, the combination with a gathering fork, of a packer comprising a frame overlying the fork, a packer arm pivoted to the front end of said frame, a toggle connection between said packer and packer arm serving as a lock for securing said packer arm in position to hold the load on said fork, and a lock tripping connection extending therefrom to a distant point, substantially as described.

4. In a machine of the kind described, the combination with a gathering fork and means for raising and lowering the same, of a packer frame pivotally supported above said fork, a packer arm pivoted to the front end of said packer frame, a toggle connection between said packer frame and packer arm serving as an automatic lock for securing the same in position to hold the load on said fork, and a connection extending from said toggle acting lock, for tripping said toggle and moving the same packer arm into a position to be lowered for engagement with the ground ahead of said fork.

5. In a machine of the kind described, the combination with a gathering fork and means for raising and lowering the same, of a back stop for the load movably supported above the rear portion of said fork, and means for anchoring the said back stop temporarily to a stack while the fork is given its initial movement out of the stack after depositing the load on the stack.

6. In a portable machine of the kind described, the combination with a gathering fork, and means for raising and lowering the same, of a back stop movably supported above the rear portion of said fork, a packer frame connected to said back stop, a packer arm movable on the front end of said packer frame and having a depending end that is engageable with the ground to force the said arm rearward under the advance movement of the machine, and which is engageable with a stack to temporarily anchor the said back stop in respect to the stack while the said fork is given its initial movement out of the stack after having deposited the load on the stack, and a lock for holding said arm against movement when in engagement with a stack.

7. In a portable machine of the kind described, the combination with a gathering fork and means for raising and lowering the same, of a back stop for the load mounted to swing above the rear portion of said fork, a gathering frame connected to said back stop, a packer arm pivoted to the front end of said packer frame, and a lock for securing said packer arm in position to hold the load on said fork, and which packer arm is engageable with the stack to temporarily anchor said back stop in respect to the stack, while said fork is being given its initial movement out of the stack after depositing the load on the stack.

8. In a machine of the kind described, the combination with a gathering fork and means for raising and lowering the same, of a back stop for the load arranged to swing above the rear portion of said fork, a packer frame connected to said back stop, a packer arm pivoted to the front end of said packer frame, a toggle serving as a lock to secure said packer arm in position to hold the load on said fork, a tripping connection extending from said toggle to a distant point for tripping said lock and moving said packer arm into a forwardly extended position, and which packer arm is engageable with the stack to temporarily anchor said back stop in respect to the stack, while said fork is being given its initial movement out of the stack after having deposited the load on the stack.

9. In a machine of the kind described, the combination with a truck having vertical guide columns, of a fork carrier movable vertically on said columns, a fork connected to said fork carriers, links suspended from projections of said fork carrier, a back stop for the load suspended by said links above the rear portion of said fork, a packer frame overlying said fork and provided with depending arms connected to the lower portion of said back stop, and a packer arm on the front end of said packer frame, substantially as described.

10. In a machine of the kind described, the combination with a truck having upright guide columns, of a fork carrier mounted for vertical movements on said columns, a gathering fork carried by said fork carrier, links suspended from forward projections of said fork carrier, a back stop pivotally suspended by said links, a packer frame overlying said fork and provided with depending extensions connected to the lower portion of said back stop, a packer arm pivoted to the front end of said packer frame, a lock for securing said packer arm in position to hold the load on said fork, and a lock trip extending therefrom to a distant point.

In testimony whereof I affix my signature in presence of two witnesses.

HENRY C. ERBE.

Witnesses:
JACOB HELM,
R. J. WEISZHAAR.

Copies of this patent may be obtained for five cents each, by addressing the "Commissioner of Patents, Washington, D. C."